No. 770,534.

Patented September 20, 1904.

UNITED STATES PATENT OFFICE.

WILHELM OSTWALD AND OSCAR GROS, OF LEIPZIG, GERMANY.

DEVELOPING CATALYTIC PICTURES.

SPECIFICATION forming part of Letters Patent No. 770,534, dated September 20, 1904.

Application filed January 22, 1904. Serial No. 190,233. (No specimens.)

*To all whom it may concern:*

Be it known that we, WILHELM OSTWALD, doctor of philosophy and professor, and OSCAR GROS, doctor of philosophy, both subjects of the German Emperor, and residents of Leipzig, in the Kingdom of Saxony, German Empire, have invented new and useful Improvements in Developing Catalytic Pictures, of which the following is a full, clear, and exact specification.

When a print of platinum, silver, or other catalytic agent is treated with ethereal hydrogen peroxid, at the parts containing the catalyzing agent the hydrogen peroxid is destroyed by catalytic action with a speed which is a function of the quantity of the agent existing at every part of the original. If this print (the so-treated original) is now pressed against paper, an invisible print of hydrogen is obtained, which print may be subsequently developed by treating the same with an ammoniacal solution of a manganese salt—for instance, a solution of fifty parts of manganese sulfate and one hundred parts water. In such a solution of a manganese salt there is present a precipitate of manganese hydroxid, whereby the print is dirtied and, among other things, injured for subsequent use as a catalyzing picture. By the present invention, to avoid this objection, there is added to the solution of the manganese salt a substance which hinders or prevents the precipitation of manganese hydroxid by ammonia; but which does not prevent the precipitation of manganese by hydrogen peroxid. Such substances are, for instance, certain ammonium salts such as ammonium chlorid, ammonium sulfate, ammonium nitrate, and the like. When these are present, no precipitation is produced by ammonia. These substances we term, for the purposes of this invention, "ammonia counteractants." Ammonium chlorid is an example of a substance of the kind in question, and when the ammoniacal solution of manganese contains this salt the invisible production in hydrogen peroxid is developed to a brown picture having clean whites, which is particularly suitable for use as a catalyzing picture, so that it can be substituted for the original in making further reproductions.

A suitable solution is made by mixing one volume of a solution of manganese sulfate containing twenty-five (25) per cent. of the salt with three volumes of a saturated solution of ammonium chlorid and then adding one volume of a saturated aqueous solution of ammonia. Other proportions may, however, be used, or the ammonium chlorid may be added together with the ammonia, or the precipitate produced by ammonia may be dissolved again by gradual addition of ammonium chlorid.

The picture obtained by use of this developer may be toned by treatment with a substance which is attacked by manganese peroxid with formation of a colored substance. Thus a dark-brown tone may be imparted by a solution of pyrogallol, a black tone by solution of gallic acid, and various tones by treatment with anilin hydrochlorid followed by other agents. The concentration of these solutions may be varied within wide limits.

Now what we claim is—

The process herein described of developing a hydrogen-peroxid image, which consists in treating the same with a solution containing a manganese salt, ammonia and an ammonia counteractant.

In testimony that we claim the foregoing as our invention we have signed our names in presence of two subscribing witnesses.

WILHELM OSTWALD.
OSCAR GROS.

Witnesses:
RUDOLPH FRICKE,
LEON ZEILTON.